United States Patent [19]

Beavers

[11] 4,033,647
[45] July 5, 1977

[54] TANDEM THRUST BEARING

[75] Inventor: John Andrew Beavers, Tulsa, Okla.

[73] Assignee: Borg-Warner Corporation, Chicago, Ill.

[22] Filed: Mar. 4, 1976

[21] Appl. No.: 663,650

[52] U.S. Cl. .................................. 308/227; 308/26; 308/33; 308/160

[51] Int. Cl.² ........................................ F16C 19/04

[58] Field of Search .......... 308/202, 139, 160, 161, 308/162, 227, 228, 33, 26

[56] References Cited

UNITED STATES PATENTS

| | | | |
|---|---|---|---|
| 5,003 | 4/1847 | Boyden | 308/139 |
| 433,143 | 7/1890 | Peck | 308/227 |
| 2,772,373 | 11/1956 | Howe | 308/160 |
| 3,158,415 | 11/1964 | Gardner | 308/202 |
| 3,276,742 | 10/1966 | Yokoi | 308/160 |

Primary Examiner—Joseph F. Peters, Jr.
Assistant Examiner—Richard A. Bertsch
Attorney, Agent, or Firm—Aubrey L. Burgess

[57] ABSTRACT

A tandem thrust bearing arrangement comprising a housing having a substantially vertical shaft journaled therein, which shaft has a load thereon, and independently mounted lower and upper thrust bearing means associated with the shaft. The lower thrust bearing means carries predetermined first portions of the imposed load while the upper thrust bearing means carries thrust loads in excess of the first part thereof, permitting full loading of the shaft in a limited spacial relationship.

6 Claims, 2 Drawing Figures

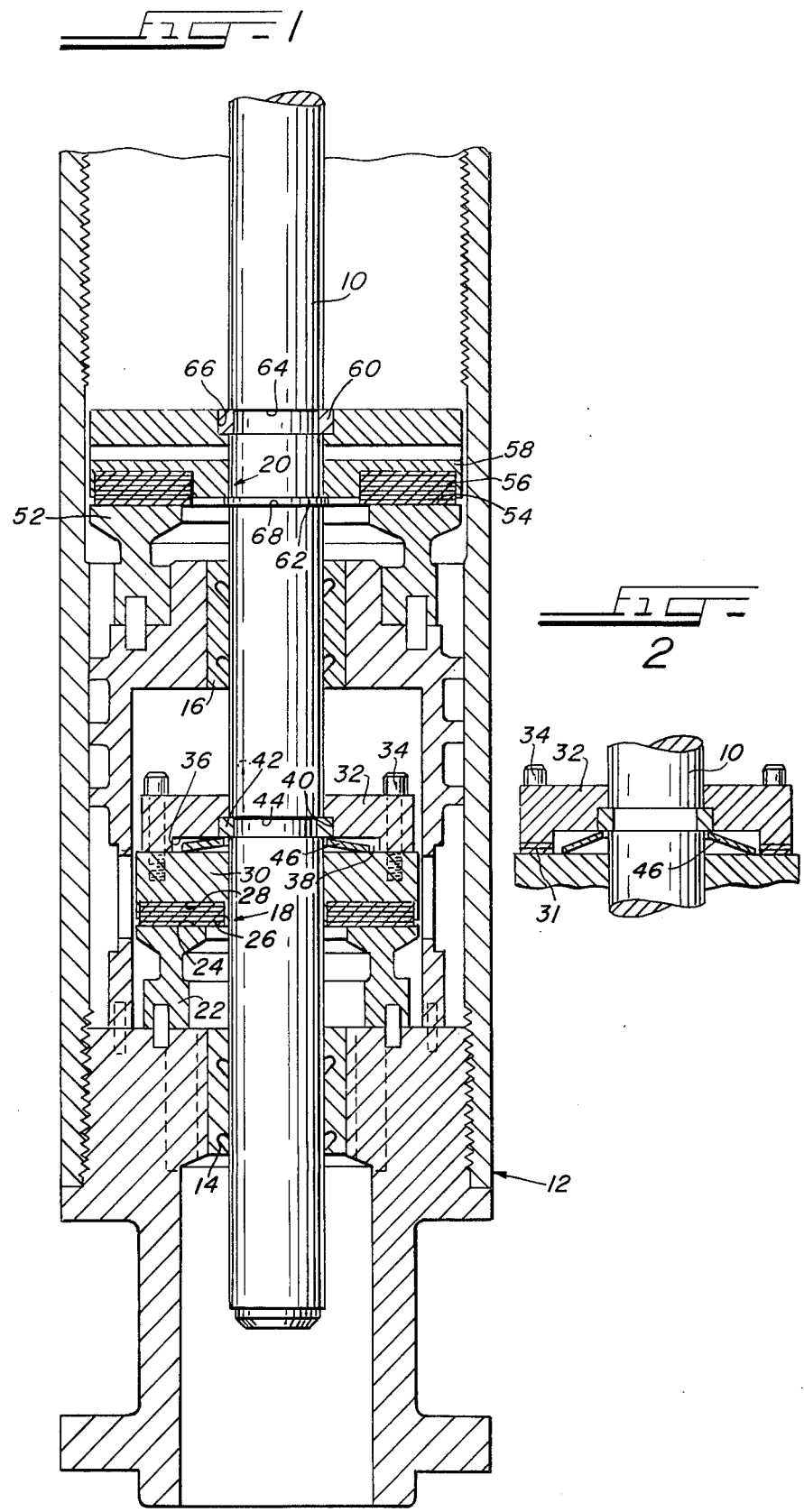

TANDEM THRUST BEARING

BACKGROUND OF THE INVENTION

The use of thrust bearings to carry the imposed load on a substantially vertical shaft is well known in the art. As imposed loads on the shaft are increased, it becomes necessary to construct large thrust bearings, which require more space. Thus, housings in which the shaft is journaled must be larger in diameter to house the shaft-thrust bearing assembly.

THE INVENTION

The invention to be described herein relates to a compact, tandem mounted thrust bearing means, so arranged and constructed that the lower thrust bearing means carries a predetermined amount of imposed thrust and the upper thrust bearing means carries the excess of the imposed thrust load. The predetermined load capacity of the lower thrust bearing means is no more than its rated load carrying capacity; the remainder is carried by the upper thrust bearing means.

The arrangement provides essentially the same load carrying capacity of a larger thrust bearing assembly without requiring the increase in housing size required to house such a larger thrust bearing assembly. A compact, tandem thrust bearing assembly of this invention can thus be used for limited space application yet carries loads in excess of a single bearing housed in a like housing.

THE DRAWINGS

FIG. 1 of the drawings is a partial, sectional view of a typical tandem thrust bearing arrangement incorporating a lower and an upper thrust bearing means, constructed according to this invention; and FIG. 2 is a partial, sectional view of the lower thrust bearing means wherein shims are used for adjustment purposes.

DETAILED DESCRIPTION

Looking now at FIG. 1 of the drawings, there is illustrated a tandem thrust bearing arrangement constructed according to this invention which comprises a substantially vertical shaft 10 journaled for rotation in a multiple-part housing 12 by spaced journals 14 and 16. Within the arrangement are lower and upper thrust bearing means 18 and 20, respectively.

The lower thrust bearing means 18 comprises an annular bearing shoe 22 keyed or otherwise connected to the housing 12 having a bearing face 24 for contact with an annular thrust bearing pad 26 received in a recess 28 in an annular thrust runner 30 which surrounds and is vertically slidable relative to the shaft 10. An annular lock ring 32 surrounding the shaft 10 is bolted by bolts 34 to the thrust runner 30. The lock ring 32 is formed with a recess 36 which, with the top of the thrust runner 30, forms an annular cavity 38 and also, the lock ring is formed with an annular recess 40 to receive a split lock ring 42 partially received in a lock ring groove 44 in the shaft 10. A spring washer or a Belleville spring 46 is received in the cavity 38 with its inner periphery bearing against the lock ring 42. The spring force (from the Belleville spring 46) acting on the thrust runner 30 is adjusted by the position of the lock ring 32. If necessary, shims 31, as illustrated in FIG. 2, may be placed between the lock ring 32 and the thrust runner 30 for adjusting the spring force.

The upper thrust bearing means 20 comprises an annular bearing shoe 52 keyed or otherwise connected to the housing 12 having a bearing face 54 for contact with an annular thrust bearing pad 56 received in a recess in an annular thrust runner 58 which surrounds the shaft 10. The thrust runner 58 is coupled for vertical movement with the shaft 10 by means of lower and upper snap rings 60 and 62, respectively, the upper snap ring fitting in a groove 64 in the shaft 10 and in an annular recess 66 in the runner 58 while the lower snap ring fits in a groove 68 in the shaft 10.

In the structure described, the lower thrust bearing means 18 carries a first part of the thrust from the shaft up to but not more than its rated limit, as determined by the preloading of the Belleville spring. The split ring 68 of the upper thrust bearing means 20 is so positioned that the runner 58 will "stand-off" the pad 56 by the amount of available travel of the lower thrust runner 32. When the lower thrust bearing means 18 is fully loaded to its capacity, as determined by the loading of the Belleville spring, the upper thrust bearing means 20 will then become operative to carry a second part of the thrust load.

The arrangement described results in a relatively small thrust bearing arrangement adaptable for use in a limited spacial relationship.

It is to be understood that the arrangement described is for illustrative purposes only; the tandem arrangement can comprise more than two thrust bearing means, i.e., three or more, as is required.

I claim:

1. A tandem thrust bearing arrangement comprising: a housing means;
a substantially vertical shaft journaled for rotation in said housing means and having a load imposed thereon;
independently mounted lower and upper thrust bearing means operatively associated with said shaft;
said lower thrust bearing means being so constructed and arranged to carry a first part of said imposed load;
said upper thrust bearing means being so constructed and arranged to carry imposed load in excess of said first part thereof;
said lower and upper thrust bearing means permitting full loading of said shaft in a limited spacial relationship.

2. A tandem thrust bearing arrangement as recited in claim 1 further comprising means for adjusting the allowable load carried by said lower thrust bearing means.

3. A tandem thrust bearing arrangement as recited in claim 2 wherein said adjusting means comprises a Belleville spring.

4. A tandem thrust bearing arrangement as recited in claim 1 in which said lower thrust bearing means comprises a thrust runner surrounding said shaft and a lock ring adjustably connected to said thrust runner, a Belleville spring between said thrust runner and said lock ring, a ring on said shaft engaging said spring, the loading of said spring being adjustable by said adjustable connection between said thrust runner and said lock ring and thus adjusting the allowable load carried by said lower thrust bearing means.

5. A tandem thrust bearing arrangement as recited in claim 1 wherein said upper thrust bearing means comprises a thrust runner and a thrust bearing pad, means supporting said upper thrust runner at a position off the upper thrust pad until said lower thrust bearing means carries said first part of said load.

6. A tandem thrust bearing arrangement as recited in claim 5 wherein said supporting means comprises a ring carried by said shaft.

* * * * *